(12) United States Patent
Kim

(10) Patent No.: US 12,319,555 B2
(45) Date of Patent: Jun. 3, 2025

(54) AUTOMATIC SAMPLING DEVICE AND METHOD

(71) Applicants: HOSAN TECH CO., LTD., Anseong-si (KR); Chul Won Kim, Seoul (KR)

(72) Inventor: Chul Won Kim, Seoul (KR)

(73) Assignees: HOSAN TECH CO., LTD., Anseong-si (KR); Chul Won Kim, Seoul (KR)

( * ) Notice: Subject to any disclaimer, the term of this patent is extended or adjusted under 35 U.S.C. 154(b) by 593 days.

(21) Appl. No.: 17/633,363

(22) PCT Filed: Aug. 28, 2020

(86) PCT No.: PCT/KR2020/011519
§ 371 (c)(1),
(2) Date: Feb. 7, 2022

(87) PCT Pub. No.: WO2021/045451
PCT Pub. Date: Mar. 11, 2021

(65) Prior Publication Data
US 2022/0281731 A1    Sep. 8, 2022

(30) Foreign Application Priority Data
Sep. 2, 2019    (KR) .................. 10-2019-0108386

(51) Int. Cl.
*B67B 7/18*    (2006.01)
*G01N 1/02*    (2006.01)
(Continued)

(52) U.S. Cl.
CPC ............. *B67B 7/18* (2013.01); *B01L 13/02* (2019.08); *G01N 1/02* (2013.01); *G01N 35/00* (2013.01);
(Continued)

(58) Field of Classification Search
None
See application file for complete search history.

(56) References Cited

U.S. PATENT DOCUMENTS

2001/0053335 A1* 12/2001 Hashimoto ........ G01N 35/0099
422/65
2022/0229079 A1*  7/2022 Riddick ........... G01N 35/00029

FOREIGN PATENT DOCUMENTS

CN    102175489 A     9/2011
JP    07-244051   *   9/1995
(Continued)

*Primary Examiner* — P. Kathryn Wright
(74) *Attorney, Agent, or Firm* — NKL Law; Jae Youn Kim

(57) ABSTRACT

Provided are an automatic sampling device and method and, more specifically, are an automatic sampling device and method which automatically remove a lid when collecting a sample in order to analyze the state of a chemical solution (medicinal fluid) and which automatically reverse a sample collection container so that the container can be used after being washed with ultrapure water, and thus the device prevents medicinal fluid contamination caused by the sample collection container, lid, adjacent objects in contact therewith, or space during sampling, without being affected by outside conditions during the sampling, prevents safety accidents such as errors or risk caused by manual work, and is improved so as to increase the reliability of sampling.

27 Claims, 15 Drawing Sheets

(51) Int. Cl.
*G01N 35/00* (2006.01)
*G01N 35/04* (2006.01)

(52) U.S. Cl.
CPC ............ *G01N 2035/00277* (2013.01); *G01N 2035/0405* (2013.01); *G01N 2035/0439* (2013.01)

(56) References Cited

FOREIGN PATENT DOCUMENTS

| | | | |
|---|---|---|---|
| JP | 07-244051 A | | 9/1995 |
| JP | 09-89901 | * | 4/1997 |
| JP | 3078284 | * | 8/2000 |
| JP | 3078284 B1 | | 8/2000 |
| JP | 2001-70897 | * | 3/2001 |
| JP | 2002-263603 A | | 9/2002 |
| JP | 2014-190907 A | | 10/2014 |
| KR | 10-2019-0052419 A | | 5/2019 |
| KR | 10-2056106 B1 | | 12/2019 |
| KR | 20230068908 | * | 5/2023 |
| WO | WO 2021045451 | * | 3/2021 |

* cited by examiner (Standby for lid lifting)

(Container advance)

(Lid lowering)

(Lid mounting)

AUTOMATIC SAMPLING DEVICE AND METHOD

TECHNICAL FIELD

The present invention relates to an automatic sampling device and an automatic sampling method and, more specifically, to an automatic sampling device and an automatic sampling method, which can prevent contamination of a chemical solution from a container, a lid, or a surrounding contact in sampling work without being affected by an external condition during the sampling work since being used after a lid is automatically separated, a container for sampling a sample is automatically inverted, the lid and the container are cleaned with ultrapure water or undiluted solution when a sample is collected to analyze a state of a chemical solution (chemical liquid).

Moreover, the present invention relates to an automatic sampling device and an automatic sampling method, which can prevent safety accidents, such as an error or a risk caused by manual work, in sampling work, and increase reliability of sampling work.

BACKGROUND ART

In general, a chemical solution used in various industrial fields as well as in a semiconductor manufacturing process is sampled for characteristic confirmation and goes through analysis work of concentration, ingredients, and the like.

In this instance, the sampling work is performed after a chemical solution sample is put in a container. A container is cleaned by shaking after cleaning water is put in the container and a lid is put on the container. After that, the cleaning water is removed from the container, and then, a chemical solution sample to be sampled is put in the container.

In this instance, if the container is not cleaned and the chemical solution is sampled, because the chemical solution sample is contaminated by materials (including ingredients) remaining in the container, it is difficult to analyze accurately and reliability in analysis of sampling is deteriorated.

Furthermore, contaminants remaining in the container may be particles, organic carbon, oil, insoluble materials, and other unwanted materials.

For such reasons, a container in which a sample will be put must be cleaned directly before sampling.

Meanwhile, as described above, the conventional container cleaning method requires great care since a worker has to manually clean the sample container in the hand.

Additionally, if the materials remaining in the container to be sampled have toxicity or are fatal to the human body, since the remaining materials splatter or are stained on the worker's hand or other body and it may cause loss of life. Therefore, the conventional container cleaning method is very weak in preventing accidents.

Therefore, the applicant of the present invention has developed an 'automatic sampling device' disclosed in Korean Patent Application No. 10-2018-0102784 (Aug. 30, 2018).

The development technology of the applicant can improve cleaning efficiency and prevent accidents since automatically inverting and cleaning a sampling container.

However, the development technology of the applicant is in an intermediate development stage which is semiautomated for full automation, and has a limitation in that a worker has to manually operate the sampling device while wearing an arm glove and separate a lid from the container.

Therefore, the present invention is required for a technological leap as a fully automatic sampling system which fully automates all sampling processes.

DISCLOSURE

Technical Problem

The present disclosure has been made to solve the above-mentioned problems occurring in the prior art, and it is an object to provide an automatic sampling device and an automatic sampling method, which can prevent contamination of a chemical solution from a container, a lid, or a surrounding contact in sampling work without being affected by an external condition during the sampling work since being used after a lid is automatically separated, a container for sampling a sample is automatically inverted, the lid and the container are washed with ultrapure water or undiluted solution when a sample is collected to analyze a state of a chemical solution (chemical liquid). Additionally, it is another object to provide an automatic sampling device and an automatic sampling method, which can prevent safety accidents, such as an error or a risk caused by manual work, in sampling work, and increase reliability of sampling work.

Technical Solution

To accomplish the above objects, there is provided an automatic sampling device including: a container standby unit (20) for preparing a plurality of containers (BT) before testing, and sequentially rotating the container standby unit (20) to select a container (BT) for extracting a sample; a container transfer unit (40) gripping the container (BT) selected by the container standby unit (20), transferring the container to a sampling chamber (300), and automatically inverting the container; and a lid separation unit (30) automatically opening and closing a lid (CAP) in the sampling chamber (300) from the container (BT) transferred by the container transfer unit (40).

In this instance, the container standby unit (20) is provided in a container standby chamber (200) disposed on one side of the upper part of a rectangular parallelepiped housing body (100), the container transfer unit (40) is mounted in a lower machine room (400) located on the other side opposed to the container standby chamber (200), and the sampling chamber (300) is located in a space between the container standby chamber (200) and the lower machine room (400).

Moreover, a sealing door (DR) which is openable is mounted between the container standby chamber (200) and the sampling chamber (300) in a vertical direction.

Furthermore, the automatic sampling device further includes: an upper machine room (500) in which a driving unit for driving the container standby unit (20) and the lid separation unit (30) is mounted above the container standby chamber (200) and the lower machine room (400); and a processing chamber (600) having auxiliary facilities, such as a pipe, a facility, and a control facility.

Additionally, the container standby chamber (200), the lower machine room (400), the upper machine room (500), and the processing chamber (600) are completely divided and partitioned by partition walls (W).

In addition, the container standby unit (20) includes: a rotor (240) for sequentially rotating the containers (BT) prepared in the container standby chamber (200) at a predetermined angle; a container seating plate (220) which is a plate-shaped member and on which the container (BT) for holding a sample solution is seated; and a rotary motor (260) for rotating the rotor (240).

Moreover, a rotation guide plate (230) having a circular hole (232) with an open side is mounted above the container seating plate (220) to be spaced apart from the container seating plate (220), and a rotor rotating shaft (250) is mounted passing through the circular hole (232) and the container seating plate (220).

Furthermore, a lower portion of the rotor rotating shaft (250) is supported by a bearing (222) provided in the container seating plate (220), and an upper portion is rotatably connected to the rotary motor (260), and the rotor (240) is fixed to the rotor rotating shaft (250).

Additionally, a bottom surface (210) of the container seating plate is provided with a solution receiver (DP) recessed downward.

In addition, a bottom plate part is formed in the sampling chamber (300) at the same height as the container seating plate (220). The bottom plate part includes a lid cleaning part (CCP) with which the lid (CAP) comes into contact and which is capable of cleaning the lid by spraying a solution through a solution nozzle (solution nozzle), and a container cleaning part (BCP) which inverts the container (BT) and is capable of cleaning the container (BT) by spraying a solution through a solution nozzle (solution nozzle) upwards.

Moreover, a sensor (sensor) for detecting whether or not the container (BT) is mounted in the container mounting space between the rotors (240) is mounted on a ceiling surface of the container standby chamber (200).

Furthermore, the container transfer unit (40) includes: an adsorption cylinder (410); an adsorption stand (450) for vacuum-adsorbing and moving the container (BT), which is selected from the container standby unit (20) to the sampling chamber (300) according to the operation of the adsorption cylinder (410); and an inversion motor (M) for rotating and driving the adsorption stand (450) so as to invert and clean the container (BT) or to make the container (BT) stand upright to hold a sample solution.

Additionally, side guides (420) are disposed on both sides of the adsorption cylinder (410), slide blocks (430) sliding according to the operation of the adsorption cylinder (410) are respectively assembled to the side guides (420), and the inversion motor (M) is fixed to the slide block (430).

In addition, the inversion motor (M) is provided with an operation rod (440), the adsorption stand (450) is fixed to an end portion of the operation rod (440), and one or a plurality of adsorption plates (460) for vacuum-adsorbing the container (BT) is mounted on the adsorption stand (450).

Moreover, the adsorption stand (450) is assembled and fixed to an end of the operation rod (440) exposed to the sampling chamber (300) after passing through the partition wall (W) between the sampling chamber (300) and the lower machine room (400).

Furthermore, the adsorption cylinder (410) is a multi-stage cylinder capable of stopping at three or more points.

Additionally, the front surface of the adsorption stand (450) is rounded, and the adsorption plate (460) is formed by dispersing and arranging a plurality of plate for vacuum-adsorption by sucking air, or is arranged in a band shape along the circumference.

In addition, the operation rod (440) is formed in a hollow structure, and has a vacuum induction tube, which allows the adsorption plate (460) to perform vacuum-adsorption through the hollow portion, and a wire for a sensor.

Moreover, a sealing container (470) is mounted on a wall surface of the lower machine room (400) of the partition wall (W) through which the operation rod (440) passes, thereby sealing around the operation rod (440) when the operation rod (440) is operated.

Furthermore, a level sensor (480) for detecting the level of the sample solution contained in the container (BT) is mounted on the upper side of the adsorption stand (450).

Additionally, the lid separation unit (30) includes: a gripper fixing pipe (320) having a lid gripper 310 fixed at an end portion thereof; a driving motor (350) having a driving gear (352) gear-coupled to a driven gear (322) attached to the gripper fixing pipe (320) to rotate the gripper fixing pipe (320); a gripper operating cylinder (340) connected to a gripper operating rod (342) mounted inside the gripper fixing pipe (320) to perform a gripping operation of the lid gripper (310); a fixed base (330) formed in the upper machine room (500) and having the driving motor (350) and the gripper operating cylinder (340) mounted therein; and a base lifting cylinder (380) moving the fixed base (330) vertically.

In addition, the vertical width of the driven gear (322) is greater than the vertical width of the driving gear (352).

Moreover, a spring (324) is interposed between the driven gear (322) and the lower end of the fixed base (330).

Furthermore, the lid separation unit (30) further includes: an LM guide (370) mounted at one side of the upper machine room (500); and a slider (360) inserted into the LM guide (370) to be slidable in a vertical direction, wherein the fixed base (330) fixed to the slider (360) moves vertically according to the operation of the base lifting cylinder (380) mounted between the LM guides (370).

In addition, the lid gripper (310) includes: a fixed body (312) which has a bipartite structure and is fixed in a form of surrounding the gripper fixing pipe (320); a vertical flow block (314) which is disposed inside the fixed body (312), is fixed to an end of a gripper operating rod (342) inserted through the gripper fixing pipe (320), and has inclined grooves (INC) formed on both sides; a horizontal flow block (316) assembled to the inclined grooves (INC) to be able to slide in an inclination direction; and a grip part (318) integrally formed on the lower end of the horizontal flow block (316) with a curvature and having a concavo-convex surface on the inner circumferential surface.

Additionally, the base lifting cylinder (380) is a multi-stage rod-less cylinder in which a rod is embedded, and only a part of the base lifting cylinder protrudes from a cylinder body.

Moreover, the door (DR) includes: a pair of door guides (270) mounted at both sides; door lifting cylinders (280) mounted at both sides of the door guides (270); and a lifting cylinder rod (282) which is connected to the door lifting cylinder (280) and to which an upper end of the door (DR) is coupled, wherein the door (DR) ascends and descends to be opened and closed according to rise and lowering of the lifting cylinder rod (282).

Furthermore, means which are transferred from the upper machine room (500) and the lower machine room (400) to the container standby chamber (200) or the sampling chamber (300) are all formed in a bar shape having a circular cross section.

In another aspect of the present invention, there is provided a method for automatically sampling a solution using an automatic sampling device, which includes a container standby chamber (200), a sampling chamber (300) for cleaning a container (BT) and a lid (CAP) and holding a sample solution, a lower machine room (400) which is located at the opposite side of the container standby chamber (200) and in which a container transfer unit (40) is mounted, and an upper machine room (500) having a driving means for driving a container standby unit (20) and a lid separation unit (30) on an upper portion of the sampling chamber (300), the method including the steps of: preparing sampling by arranging a container (BT) having a lid (CAP) in a space between rotors (240) of the container standby unit (20) provided in the container standby chamber (200); moving the container (BT) to an open position of the lid (CAP) on the sampling chamber (300) after vacuum-adsorbing the container (BT) by advancing the adsorption stand (450) of the container transfer unit (40); lowering the lid gripper (310) of the lid separation unit (30) to grip the lid (CAP), separating the lid (CAP) from the container (BT), and lifting the separated lid (CAP); moving the adsorption stand (450) backward to move the container (BT), form which the lid (CAP) is separated, to a sampling position, and lowering the lid (CAP); rotating an inversion motor (M) of the container transfer unit (40) to invert the container (BT) at 180°, and cleaning the lid (CAP) and the inside of the container (BT) with a solution or ultrapure water; and standing the inverted container (BT) upright, and injecting a sample solution into the container (BT).

Additionally, the automatic sampling method further includes: opening a door (DR) mounted between the container standby chamber (200) and the sampling chamber (300) before performing the step of moving the container (BT) to a lid opening position; and closing the door (DR) after performing the step of moving the container (BT) the lid opening position.

In addition, the automatic sampling method further includes: when the step of injecting the sample solution into the container (BT) is completed, lifting the lid gripper (310) while gripping the lid (CAP), advancing the adsorption stand (450) to move the container (BT) below the lid (CAP), and locking the lid (CAP) on the container (BT); lifting the lid gripper (310) by releasing the gripped state, and opening the door (DR); advancing the adsorption stand (450) to discharge the container (BT) holding the sample solution to the container standby chamber (200), and returning the adsorption stand (450) to the home position by releasing vacuum adsorption state; and rotating the rotor (240) to extract the sampling-completed container (BT) and waiting a next container (BT).

Advantageous Effects

The automatic sampling device and the automatic sampling method according to the present invention can obtain the following effects.

First, the present invention can provide a fully automated system which can fully automate series of processes of opening a lid after a sample container is supplied, cleaning the lid and the container, performing sampling work, and discharging a sample after closing the lid.

Second, the container which a sample will be put in as well as the lid are inverted at 180 degrees in order to be cleaned, and the lid and the inside and the lip part of the container are completely cleaned, so that cleaning efficiency is remarkably improved.

Third, the present invention can prevent accidents since the sampling work is performed excluding manual operation absolutely due to the full automation.

Fourth, the present invention can prevent deterioration of the sample solution since cleaning by the full automation in a closed space and having excellent remaining material removal function, and can facilitate more accurate analysis of the sample.

MODE FOR INVENTION

Hereinafter, preferred embodiments of the present invention will be described in detail with reference to the accompanying drawings.

In description of the present invention, particular structures or the functional explanations are suggested only for the purpose of explaining the embodiment depending on the concept of present invention.

Therefore, the embodiments according to the concept of present invention can be performed in various forms, and it shall not be interpreted to be limited to the embodiments explained in this specification or the application.

Moreover, the embodiments for the concept of present invention are not to be limited to a certain disclosure form, and it shall be understood to include every change, equivalencies and the alternatives which are included in the range of the idea and technology of present invention.

Figure 1:
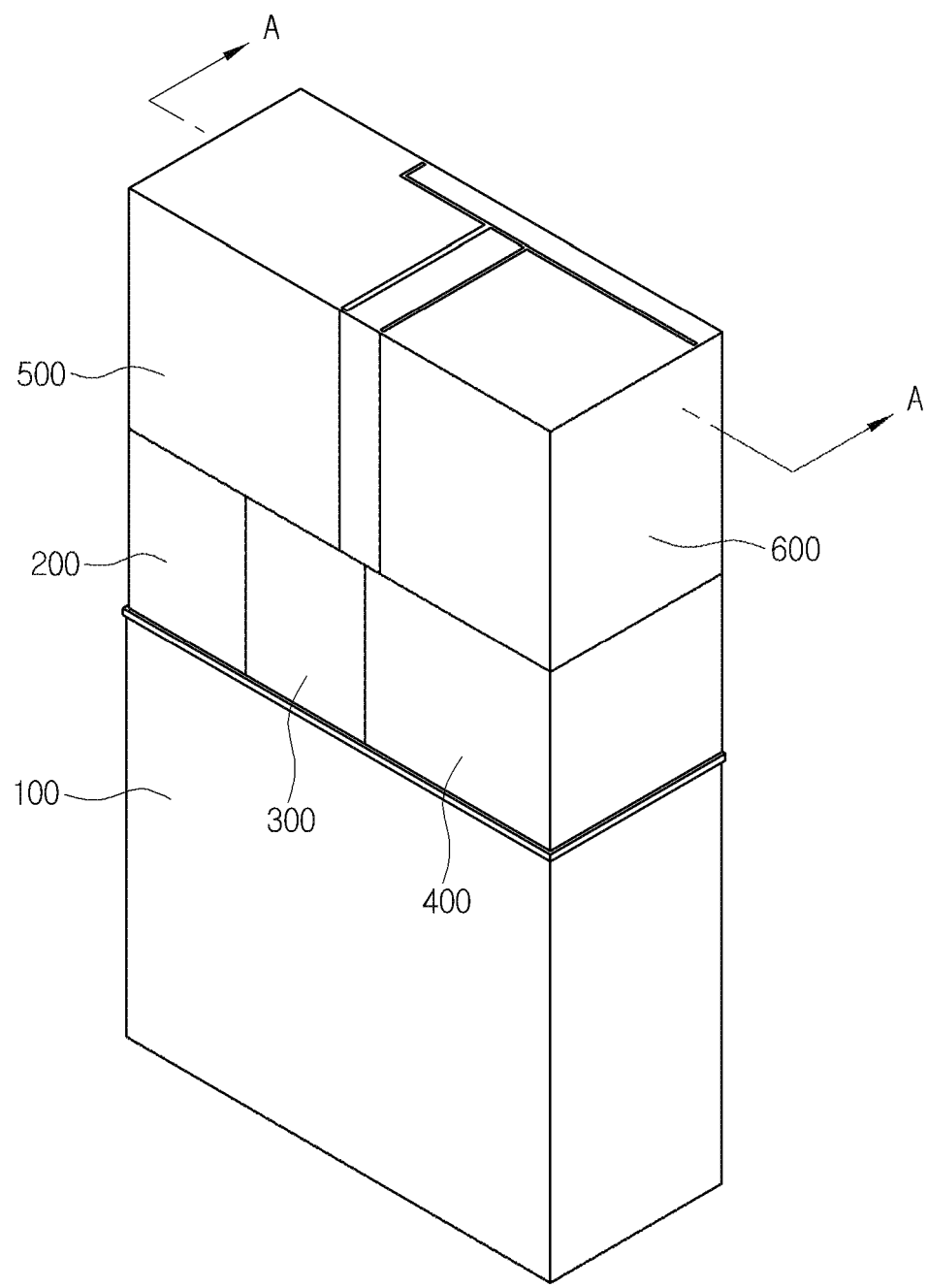
FIG. 1 is a view illustrating an automatic sampling device according to the present invention.
Figure 2:
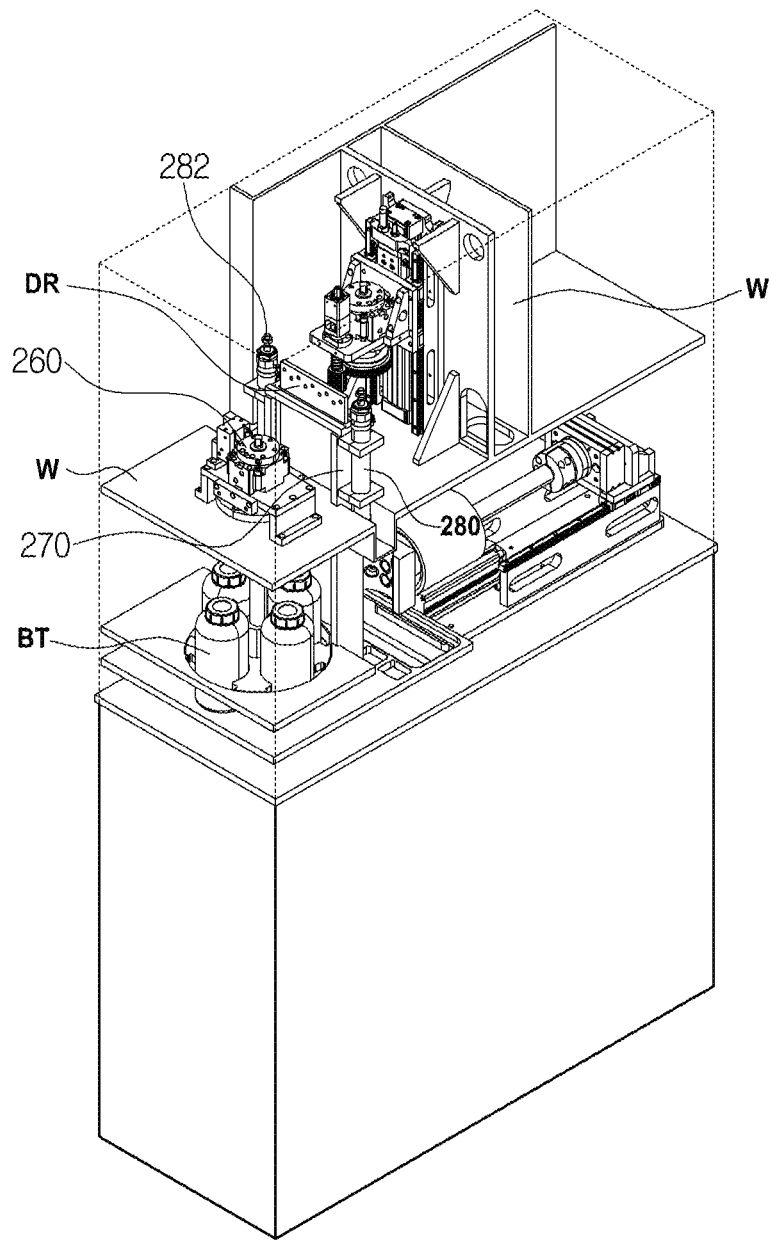
FIGS. 2 and 3 are partial views illustrating essential parts of the automatic sampling device at different angles.
Figure 3:
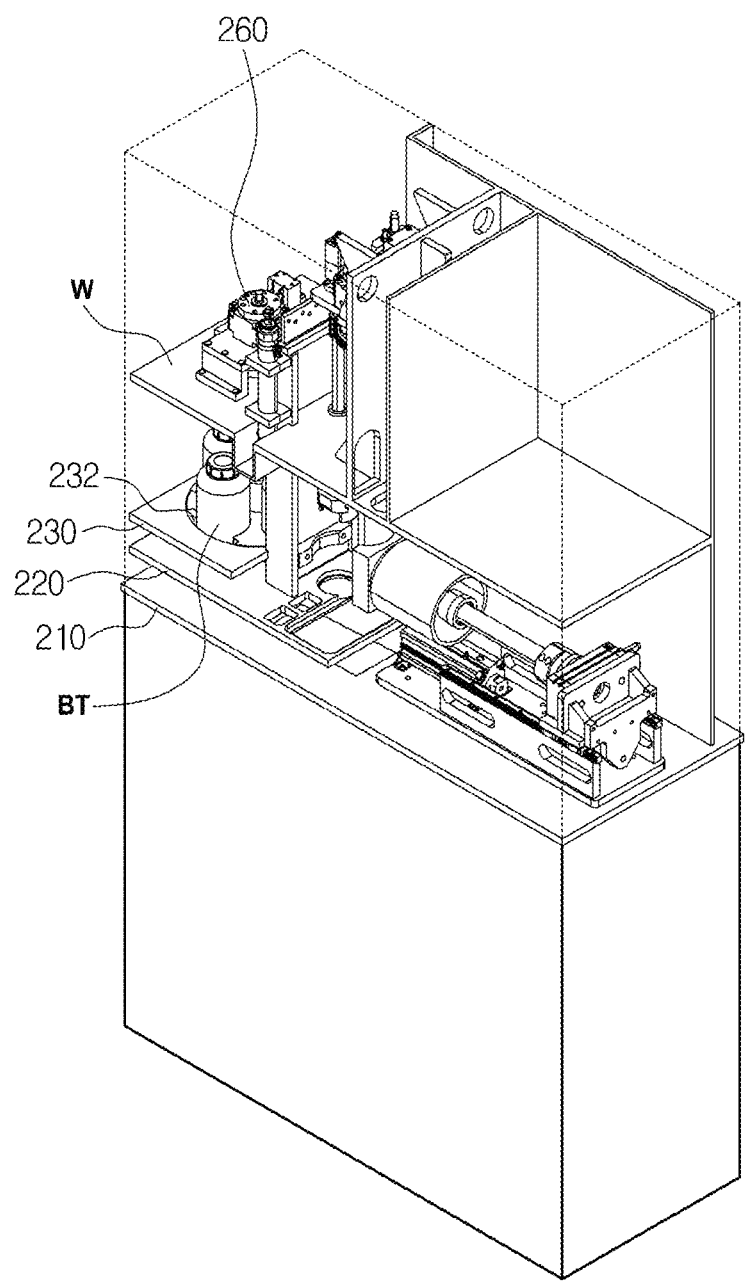
Figure 4:
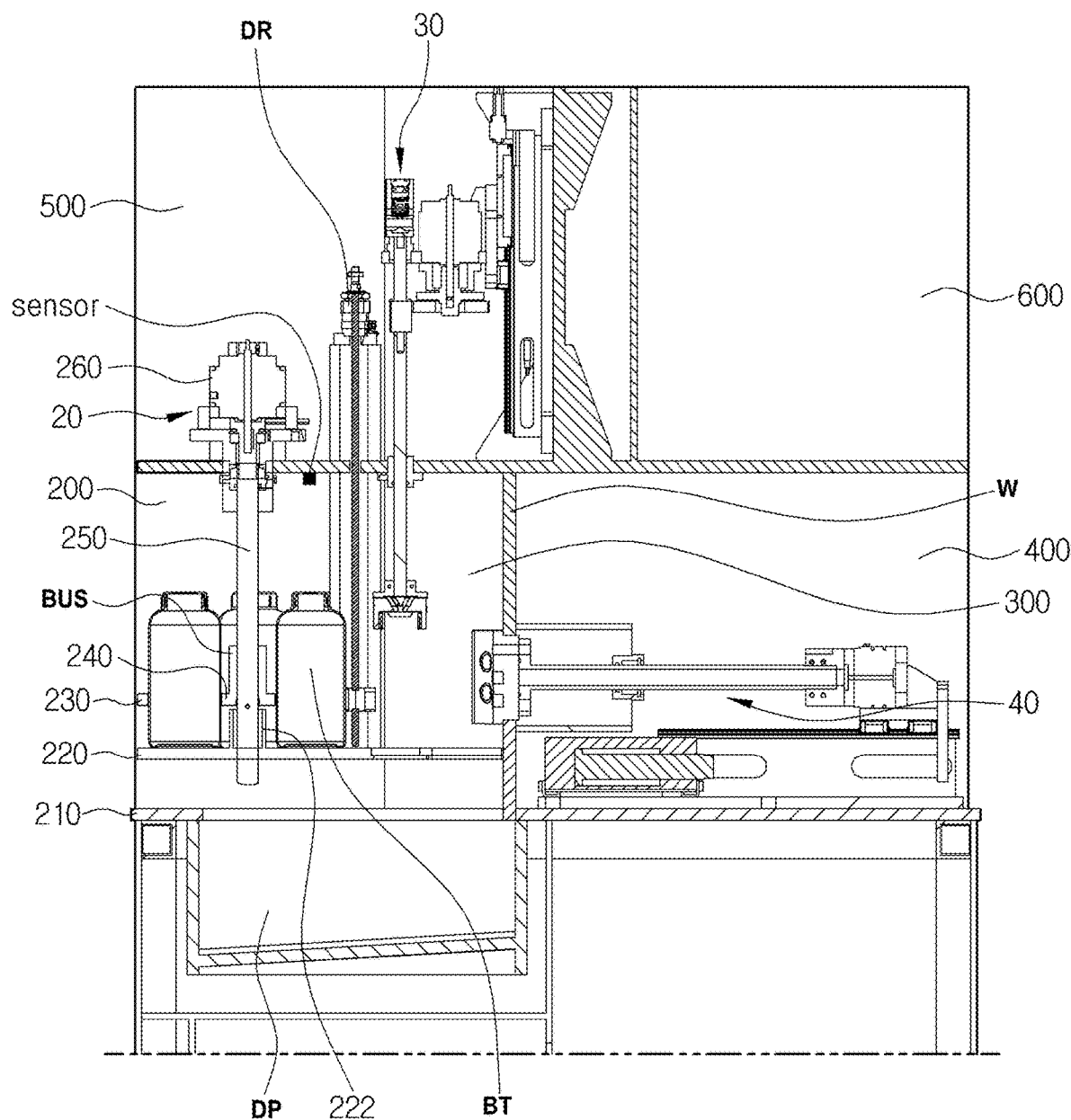
FIG. 4 is a partially sectional view taken along the line A-A of FIG. 1.

As illustrated in FIGS. 1 to 3, an automatic sampling device according to the present invention includes a rectangular parallelepiped housing body 100.

Furthermore, a container standby chamber 200, a sampling chamber 300, a lower machine room 400, an upper machine room 500, and a processing chamber 600.

Especially, between the container standby chamber 200 and the sampling chamber 300, mounted is a door (DR) for sealing which is openable vertically is mounted, and the rest of the above-mentioned components are completely separated and partitioned by a partition wall (W).

Additionally, the container standby chamber 200 is a space in which a container (BT) for holding a sample solution is prepared and stands by.

In order to prepare the container (BT), as illustrated in FIGS. 3 to 6, a container seating plate 220 of the container standby chamber 200 serves to divide a space above the container seating plate 220 from a space below the container seating plate 220, and a solution receiver (DP) is recessed downward from a floor surface 210 located below the container seating plate 220.

The solution receiver (DP) is to receive and collect the solution used when a lid (CAP) and the container (BT) are cleaned.

Moreover, the container seating plate 220 is disposed above the floor surface 210 at an interval from the floor surface 210.

The container seating plate 220 is a plate-shaped member on which the container (BT) which will hold a sample solution is seated.

Furthermore, a rotational guide plate 230 is disposed above the container seating plate 220 at an interval from the container seating plate 220.

Especially, the rotational guide plate 230 includes a circular hole 232 (see FIG. 3) opened at one side.

The opened portion of the circular hole 232 is close to the door (DR).

This is because the container (BT container) must be taken out when the door (DR) is opened.

Additionally, a rotor rotating shaft 250 is mounted by penetrating the center of the circular hole 232 and the container seating plate 220.

In this instance, a portion of the lower end of the rotor rotating shaft 250 is rotatably supported and fixed by a bearing 222 (see FIG. 4) provided in the container seating plate 220.

In addition, a bush (BUS) is fixed to the rotor rotating shaft 250, and a rotor 240 is integrally formed around the bush (BUS).

In this instance, preferably, the rotor 240 has a shape to have at least one container receiving groove, for instance, a cross shape, and it means that the shape is formed such that the container (BT) can be inserted at an interval of 90°, and the rotor serves as a turntable.

Here, in order to easily insert and grasp the container (BT), the rotor 240 may have a curvature formed at the cross part of the rotor 240.

Moreover, the rotor 240 is preferably disposed in the circular hole 232.

Furthermore, the rotor rotating shaft 250 is exposed to the inside of the upper machine room 500 by penetrating a partition wall (W) between the container standby chamber 200 and the upper machine room 500, and is connected to a rotary motor 260 mounted in the upper machine room 500 to be rotated.

Figure 5:
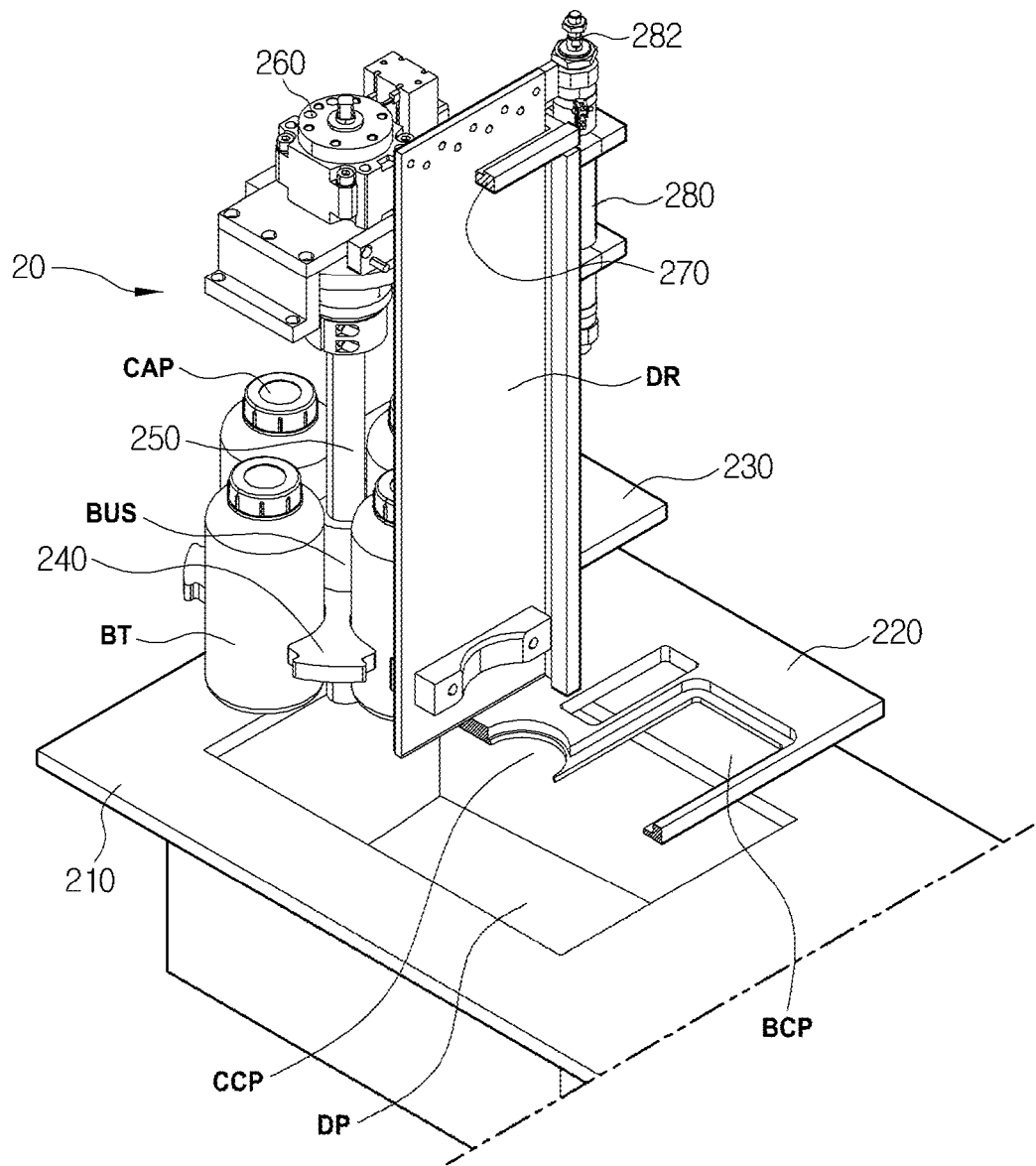
FIG. 5 is a view illustrating operational relationship between a rotor and a door of the automatic sampling device according to the present invention.
Figure 6:
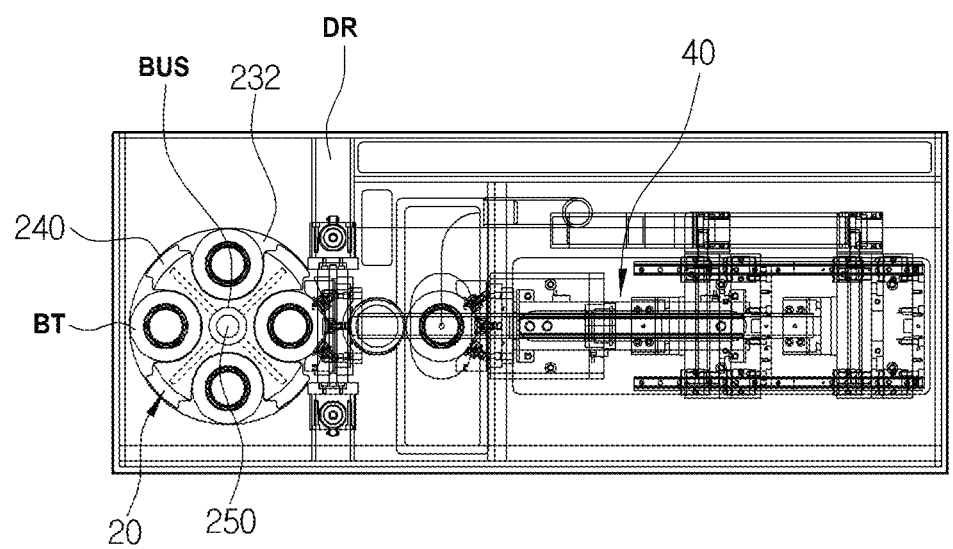
FIG. 6 is a sectional view in plan of FIG. 1.

Additionally, as illustrated in FIG. 5, a separate plate is separately formed inside the sampling chamber 300 at the same height as the container seating plate 220 so as to form a bottom plate part of the sampling chamber 300, and is arranged on the solution receiver (DP) on the top of the bottom surface 210.

In addition, the sampling chamber 300 includes: a lid cleaning part (CCP) in which the lid (CAP) is closely attached to the bottom plate part of the sampling chamber 300 so as to clean the lid by spraying cleaning solution through the solution nozzle (solution nozzle); and a container cleaning part (BCP) capable of cleaning the container by spraying cleaning solution upward from the lower part through the solution nozzle (solution nozzle) when the container (BT container) is turned upside down.

In this instance, the cleaning solution dropping down during the cleaning of the solution is received and collected into the solution receiver (DP).

Moreover, the solution nozzle (solution nozzle) capable of cleaning may be provided at the center of the lid cleaning part (CCP) and the container cleaning part (BCP).

Figure 7:
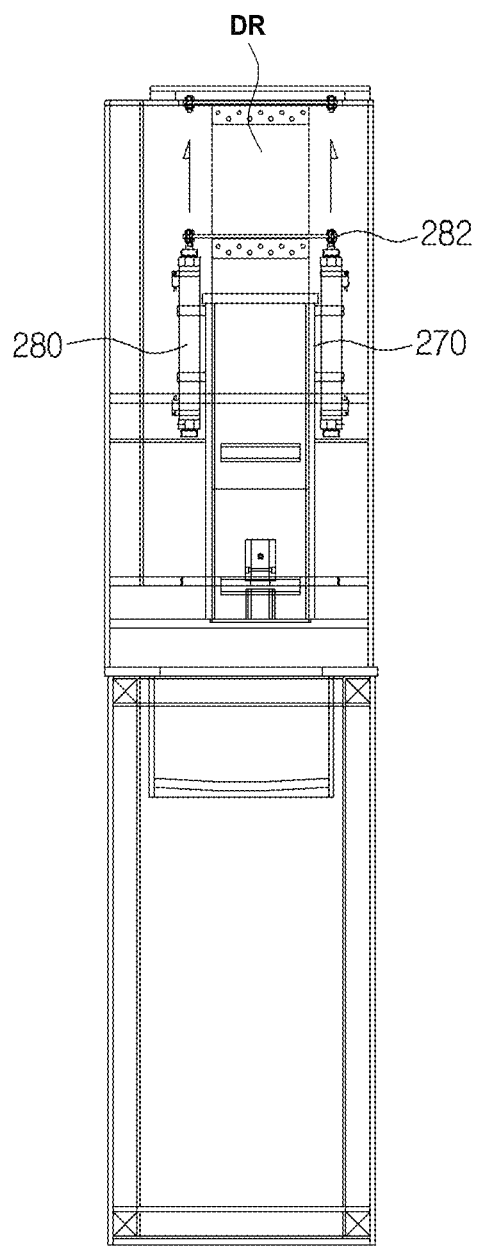
FIG. 7 is a side sectional view of FIG. 1.

Meanwhile, as illustrated in FIGS. 2, 5, and 7, the door (DR) is slidably mounted in the vertical direction by a pair of door guides 270 mounted at both sides thereof.

At this time, the door guide 270 is naturally mounted to be sealed so as to prevent contamination caused by communication between the container standby chamber 200 and the sampling chamber 300.

Additionally, a door lifting cylinder 280 is mounted on each outer side of the door guide 270, a lifting cylinder rod 282 is mounted to be connected to the door lifting cylinder 280, and an upper end of the door (DR) is coupled to an end of the lifting cylinder rod 282.

Therefore, according to the lifting and lowering of the lifting cylinder rod 282, the door (DR) is opened and closed while being ascended or descended.

In addition, a cushion material for increasing sealing performance (sealability) is provided at the upper end and the lower end of the door (DR).

Figure 8:
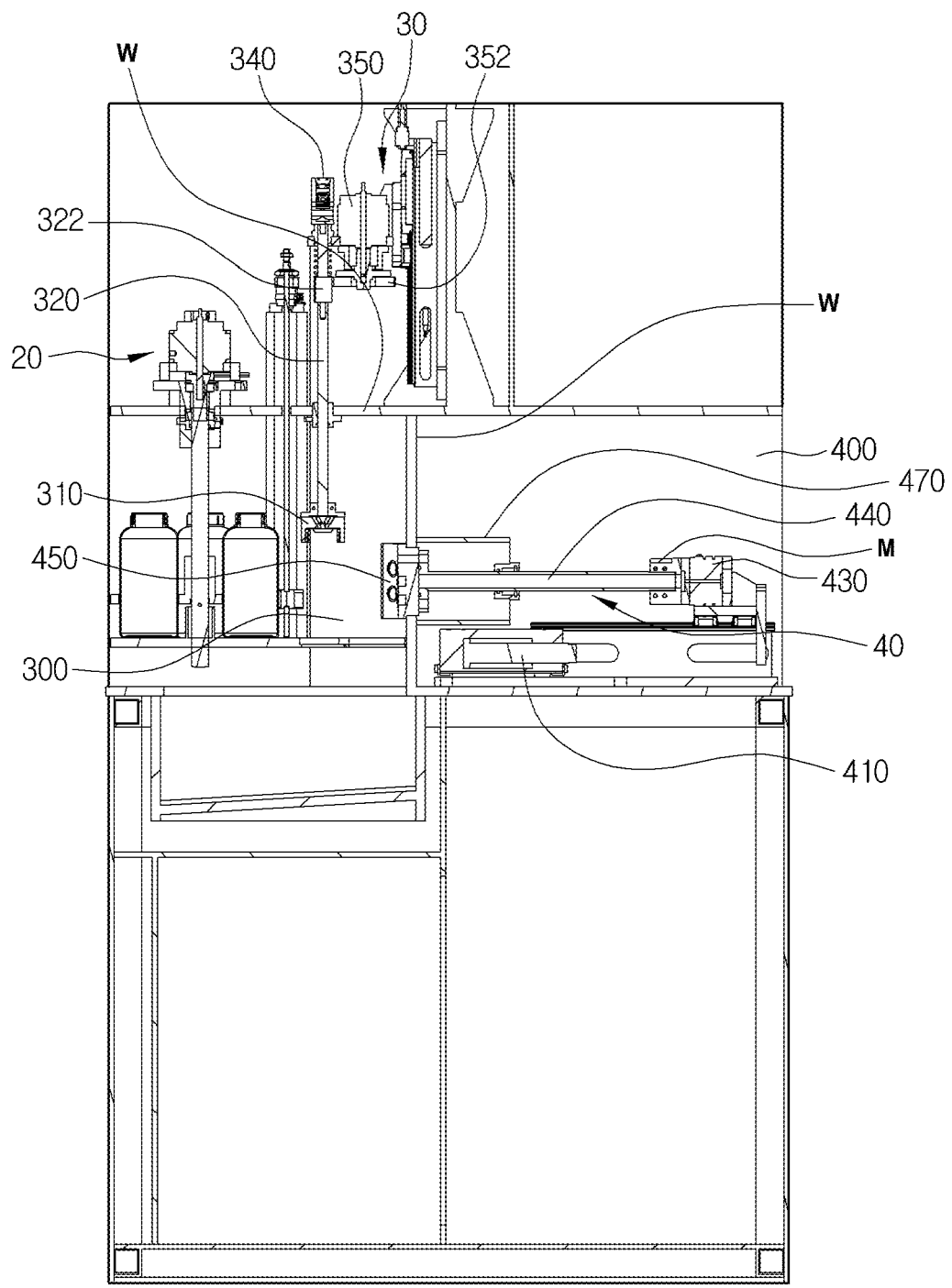
FIG. 8 is a partially sectional view illustrating the automatic sampling device according to the present invention.
Figure 9:
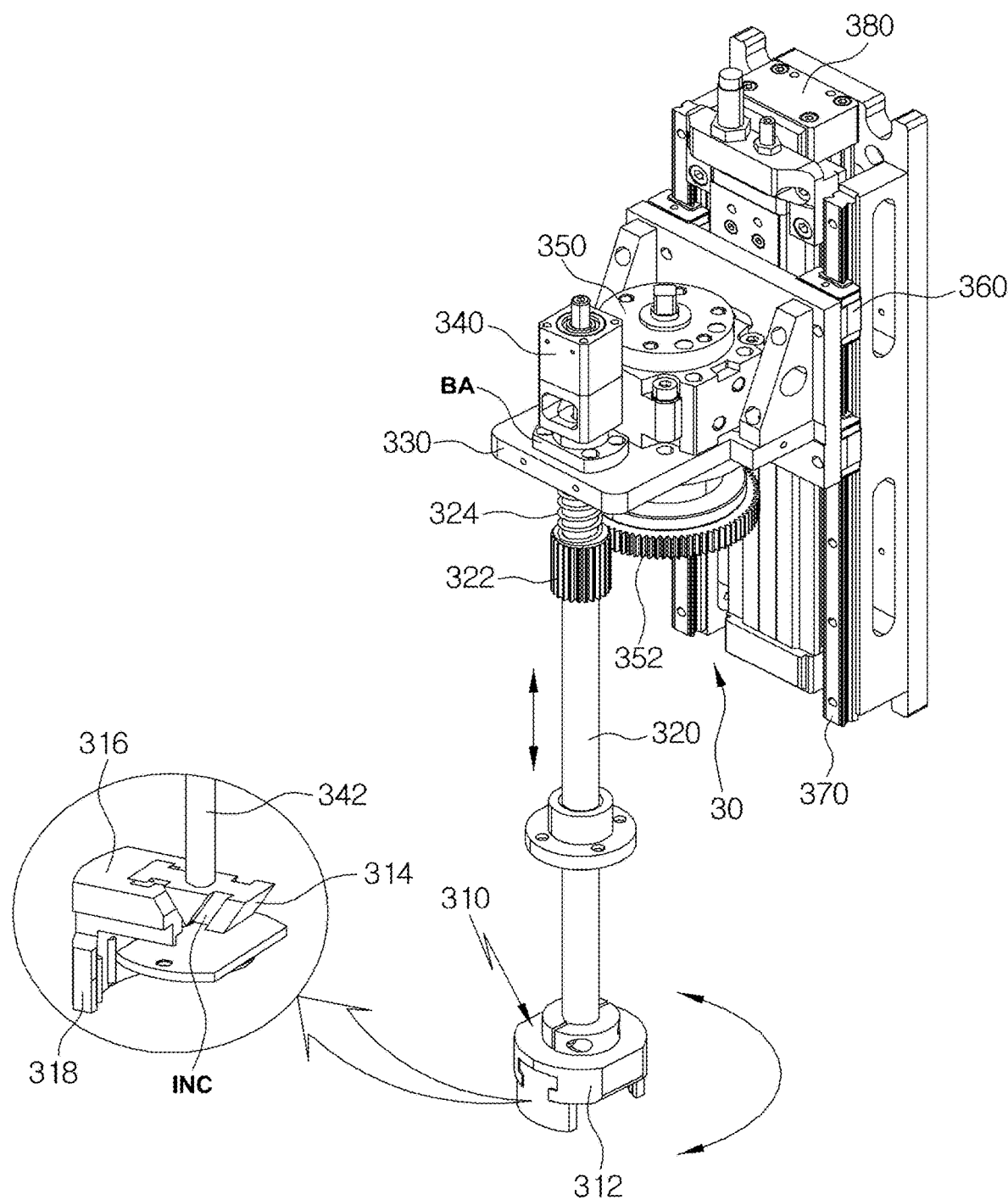
FIG. 9 is a view illustrating an operational relationship of a lid gripper of the automatic sampling device according to the present invention.

Moreover, the sampling chamber 300 is provided with a lid gripper 310 as illustrated in FIGS. 8 and 9, and the lid gripper 310 is fixed to the end of a gripper fixing pipe 320.

Furthermore, the upper end of the gripper fixing pipe 320 is supported by a bearing (BA) having a sealing material (O-ring or the like) which is disposed to be rotated in place on a fixed base 330 by passing through a partition wall (W) partitioning the sampling chamber 300 and the upper machine room 500.

In this case, a gripper operating cylinder 340 is fixed on the upper end of the gripper fixing pipe 320.

In addition, a gripper operating rod 342 connected to the gripper operating cylinder 340 is connected to the lid gripper 310 by vertically penetrating the gripper fixing pipe 320.

That is, the bearing (BA) is not to fix the gripper fixing pipe 320 not to be moved but to support the gripper fixing pipe 320 to be rotated. Therefore, the gripper fixing pipe 320 is formed to be vertically movable together with the gripper operating cylinder 340.

This is because the lid (CAP) can be opened only when rising from the container (BT) as much as the increase due to spiral sliding caused when the lid (CAP) is opened.

Moreover, the fixed base 330 is provided in the upper machine room 500.

In particular, a driven gear 322 is integrally fixed at an upper end portion of the gripper fixing pipe 320 with an interval therebetween, and a spring 324 is interposed between the driven gear 322 and the fixed base 330.

The spring 324 is inserted into the gripper fixing pipe 320.

Therefore, when the gripper fixing pipe 320 descends while rotating in order to lock the lid (CAP), the lid (CAP) is locked more tightly while complementing the distance movement caused by the sliding movement and buffering elastically.

Furthermore, a driving motor 350 is mounted on the upper surface of the fixed base 330, a motor shaft of the driving motor 350 is arranged in a state of penetrating the fixed base 330, and a driving gear 352 is fixed to the motor shaft.

Additionally, the driving gear 352 is gear-coupled with the driven gear 322.

In this instance, the vertical width of the driven gear 322 should be greater than twice the vertical width of the driving gear 352. The driven gear 322 is moved up and down together with the gripper fixing pipe 320 since being fixed to the gripper fixing pipe 320, but the driving gear 352 is not so.

In addition, sliders 360 are fixed to the fixed base 330. The sliders 360 are respectively inserted into LM guides 370 to be slid up and down along the sliders 360.

The LM guides 370 are mounted to be erected on one side of the upper machine room 500, and a base lifting cylinder 380 is mounted between the LM guides 370.

The base lifting cylinder 380 may be a multi-stage cylinder. The base lifting cylinder 380 is a rod-less cylinder in which a rod is embedded in the cylinder, and only a part of the base lifting cylinder 380 protrudes from the cylinder body. The fixed base 330 is fixed to the protruding part to have a sufficient stroke in a narrow space.

Moreover, as illustrated in FIG. 9 showing an enlarged view illustrating a part of the lid gripper 310 in a circle, the lid gripper 310 includes: a fixed body 312 which has a bipartite structure and is fixed to a gripper fixing pipe 320 in a form of surrounding the gripper fixing pipe 320; a vertical flow block 314 which is disposed inside the fixed body 312, is fixed to an end of a gripper operating rod 342 inserted through the gripper fixing pipe 320, and has inclined grooves (INC) formed on both sides; a horizontal flow block 316 assembled to the inclined grooves (INC) to be able to slide in an inclination direction; and a grip part 318 integrally formed on the lower end of the horizontal flow block 316 with a curvature and having a concavo-convex surface on the inner circumferential surface.

In this instance, portions which are symmetrical in a diameter direction of the fixed body 312 should be open such that the horizontal flow block 316 can be retracted.

Therefore, when the gripper operating cylinder 340 is operated to lower the gripper operating rod 342, since the gripper fixing pipe 320 is fixed, the fixed body 312 fixed thereto maintains the fixed state.

Because the vertical flow block 314 fixed to the lower end of the gripping operation rod 342 lowers, the horizontal flow block 316, which is inclinedly engaged with the vertical flow block, is naturally pushed and spread.

The above case occurs when the gripped lid (CAP) is released. On the contrary, when the gripper operating rod 342 rises upward, the horizontal flow block 316 is retracted to grip the lid (CAP).

Figure 10:
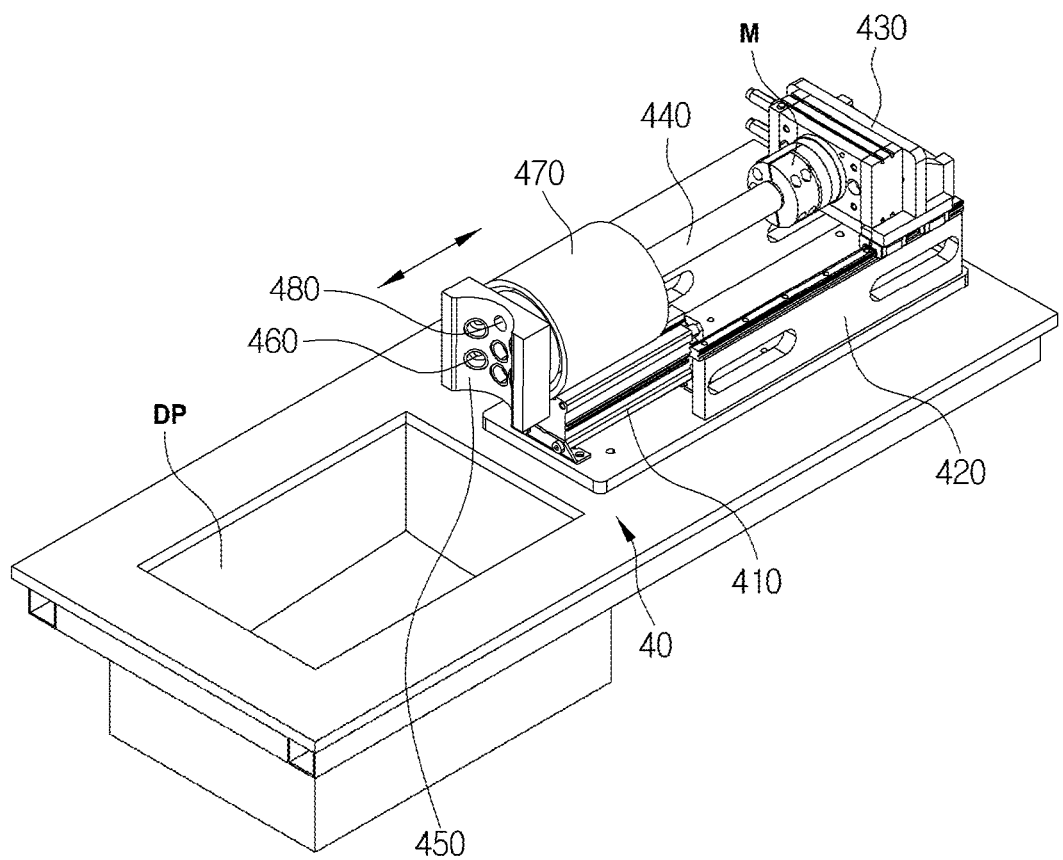
FIG. 10 is a view illustrating an operational relationship of an adsorber of the automatic sampling device according to the present invention.

On the other hand, as illustrated in FIGS. 8 and 10, an adsorption cylinder 410 is mounted in the lower machine room 400, and the adsorption cylinder 410 is the same rod-less cylinder as the base lifting cylinder.

Furthermore, side guides 420 are arranged on both sides of the adsorption cylinder 410, and a slide block 430 is assembled to the side guides 420 to be able to slide.

In addition, a cylinder rod (not shown) released from the adsorption cylinder 410 is connected and fixed to the slide block 430.

Therefore, the slide block 430 reciprocates linearly along the side guide 420 according to the driving direction of the adsorption cylinder 410.

In this instance, the suction cylinder 410 is a multi-stage cylinder, especially a multi-stage cylinder capable of stopping at three points.

The reason for using the multi-stage cylinder is to accurately position the location of the lid (CAP) and the location of which the container is inverted at 180°, in a state where the container (BT) is adsorbed.

Additionally, an inversion motor (M) is fixed on the slide block 430, an operation rod 440, which is a motor shaft, is provided on the inversion motor (M), an adsorption stand 450 is fixed to an end of the operation rod 440, and a plurality of adsorption plates 460 are mounted on the adsorption stand 450.

Here, because the adsorption stand 450 must be located in the sampling chamber 300, the operation rod 440 penetrates the partition wall (W) between the sampling chamber 300 and the lower machine room 400 and is assembled and fixed to the end of the partition wall.

In this instance, the front side of the adsorption stand 450 is round-processed so as to easily grip the container (BT), and the adsorption plate 460 is formed as a plate for vacuum-adsorbing air by sucking the air. A plurality of adsorption plate 460 may be dispersed and arranged as illustrated in the drawing or may be arranged in a band shape along the circumference. In addition, any other deformable example of the adsorption stand 450 can be modified.

Moreover, the operation rod 440 has a hollow structure, and has a vacuum induction tube, which allows the adsorption plate 460 to perform vacuum-adsorption through the hollow portion, and a control line, such as a wire for a sensor.

Furthermore, a sealing container 470 can be further mounted on the wall surface of the lower machine room 400 of the partition wall (W) through which the operation rod 440 passes.

The sealing container 470 is configured such that the operation rod 440 passes through so as to perfectly block fumes from being introduced into the lower machine room 400 through a circumferential gap when the operation rod 440 moves into and out of the sampling chamber 300.

The reason to block the fumes is that a large amount of fumes are generated when a solution is sampled in a sampling chamber 300, and if some of the fumes are introduced into the lower machine room 400, most of mechanical facilities made of metal are easily corroded to reduce the lifespan.

Additionally, a level sensor 480, which is a liquid level detection sensor, is mounted on the upper side of the adsorption stand 450. The level sensor 480 detects it if the sample solution contained in the container (BT) reaches a predetermined level and stops injection of the sample solution so as to prevent the sample solution from overflowing.

In addition, the inversion motor (M) performs a function of inverting the container (BT) at 180° in order to clean the container (BT).

That is, the lip portion of the container (BT) is rotated at 180° so that the lip portion thereof faces downward.

Then, a solution or ultra-pure water is sprayed from the lower part to clean all the lip portion as well as the inside of the container (BT), and the used cleaning solution drops down to be received into the solution receiver (DP).

Moreover, the processing chamber 600 is a space in which a pipe, a facility, a control facility, etc. are mounted for cleaning the lid or the container or sampling a solution in the container by using a facility or a solution or ultrapure water for sucking and safely discharging fumes inside each of the chambers and machine rooms continuously.

Furthermore, if necessary, the entire sampling chamber 300 is sprayed with ultra-pure water to periodically clean the sampling chamber 300.

In this configuration, the present invention is controlled to do sampling after cleaning all of the container (BT), the lid (CAP), the lip of the container (BT), and the contact portion of the container before sampling through the following method.

Figure 11:
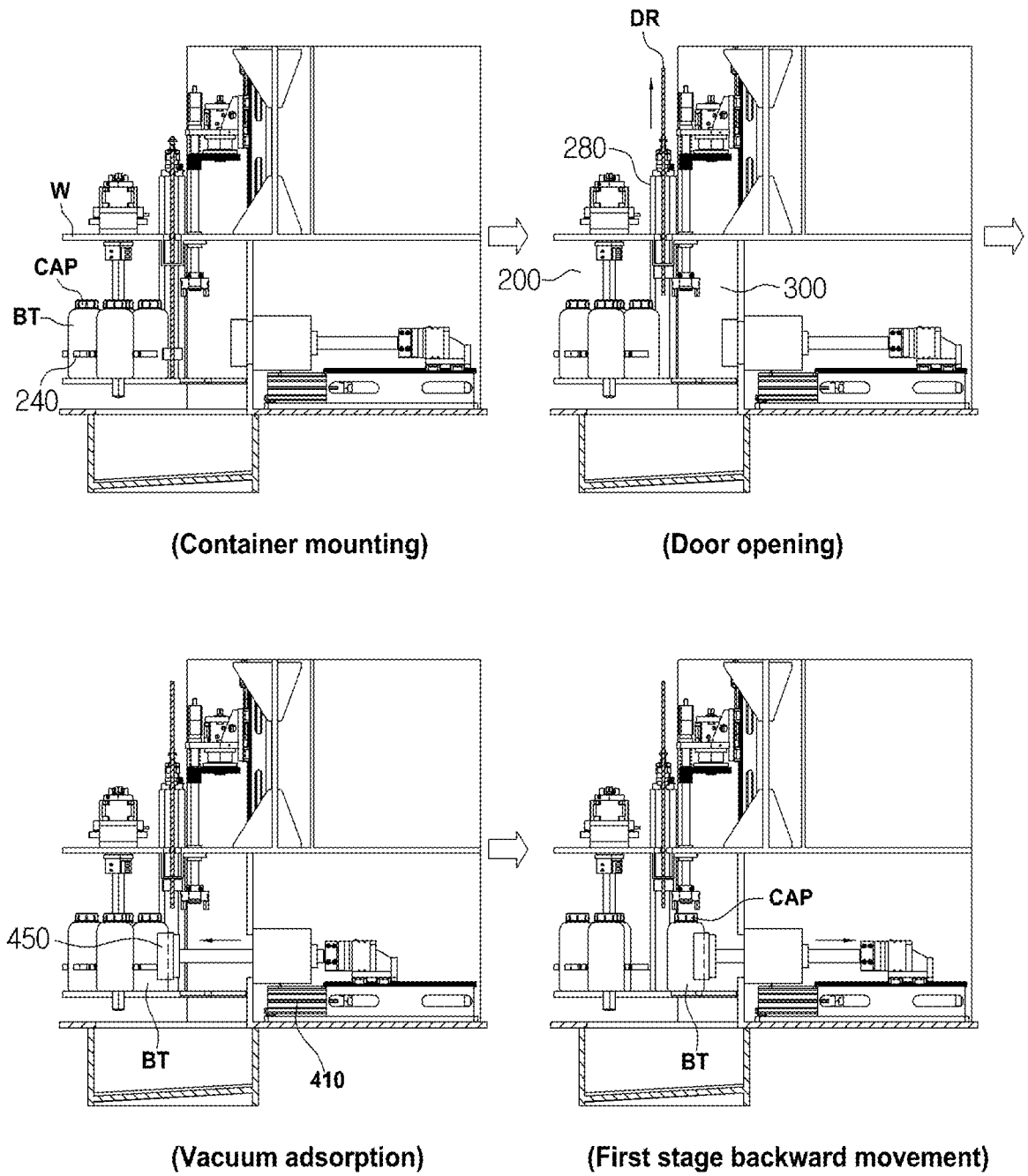
FIGS. 11 to 15 are process sequence diagrams illustrating how to sample automatically using the automatic sampling device according to the present invention.

For example, as illustrated in FIG. 11, a container (BT) closed with a lid (CAP) is mounted in an empty space between rotors 240.

Then, as illustrated in the drawing, a plurality of containers (BT) are in a standby state for receiving a sample.

In this instance, a sensor (sensor), e.g., a photo sensor, capable of detecting whether a container (BT) is present on a partition wall (W), which is a ceiling surface above the empty space between the rotors 240 on which the container (BT) is positioned, can be further mounted, and efficiency in process control can be promoted through the sensor (sensor).

Continuously, the door lifting cylinder 280 is operated to raise the door (DR). Accordingly, when the door (DR) is opened, the container standby chamber 200 and the sampling chamber 300 are connected to each other.

In this state, the adsorption stand 450 advances toward the container (BT), and then, performs vacuum-adsorption when the absorption stand 450 comes into contact with the container (BT).

At this time, the adsorption stand 450 is driven by the operation of the adsorption cylinder 410, and the vacuum adsorption is performed by sucking air through the adsorption plate 460.

When the container (BT) is adsorbed, the adsorption stand 450 is moved backward at the first stage.

Here, the first stage backward movement means a backward movement to a position where the lid (CAP) can be attached/detached.

Figure 12:
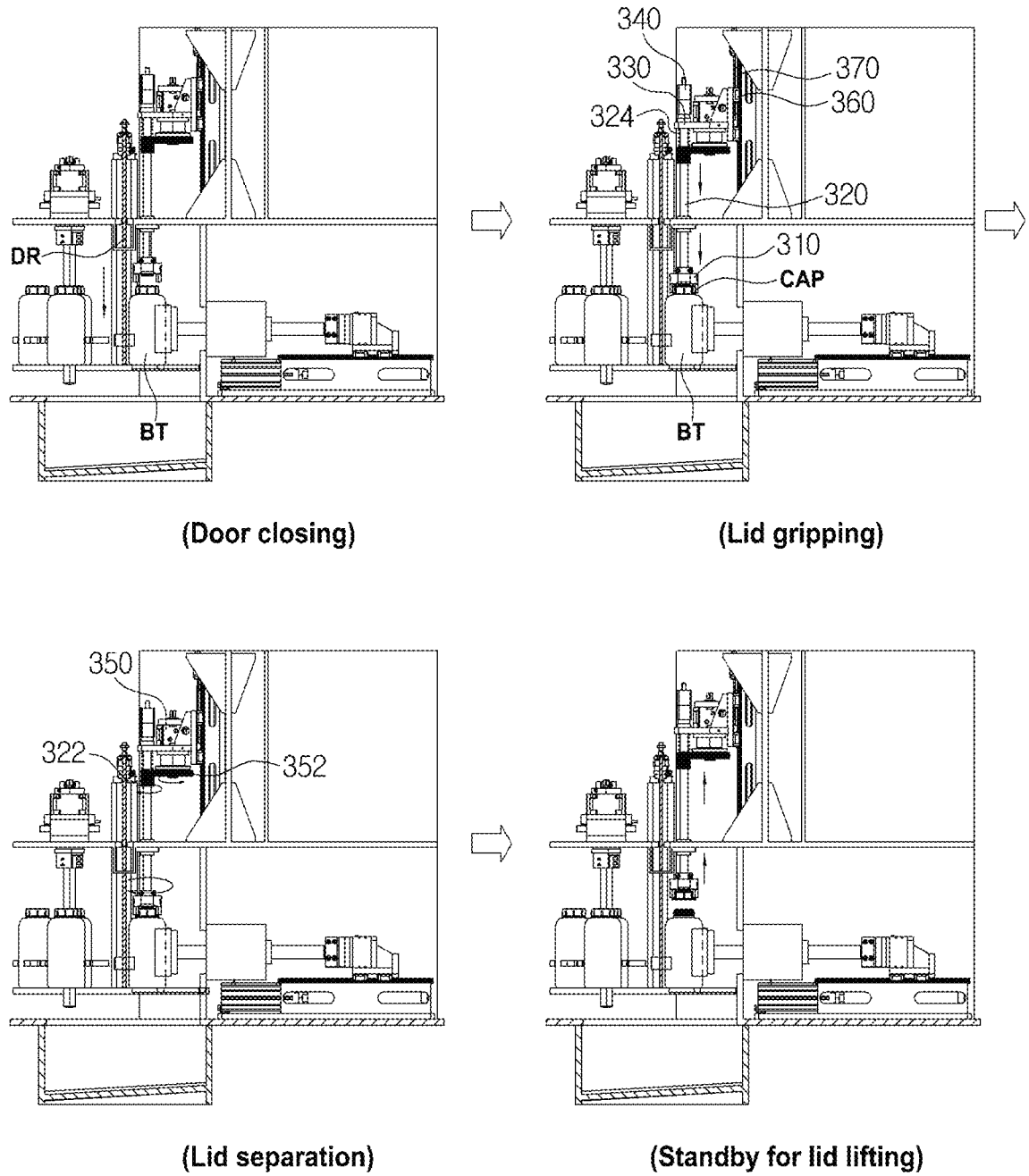

When the first stage backward movement is completed, as illustrated in FIG. 12, the door (DR) lowers down to seal the sampling chamber 300.

When the door (DR) is closed and the sampling chamber 300 is closed, the lid gripper 310 is lowered to grip the lid (CAP).

When the base lifting cylinder 380 is operated, the slider 360 descends along the LM guide 370, the fixed base 330 fixed on the slider 360 also descends, and the gripper fixing pipe 320 mounted on the fixed base 330 also descends together with the fixed base 330, so that the lid gripper 310 descends.

In addition, the lid gripper 310 inserted into the lid (CAP) lifts the gripper operation rod 342 while the gripper operating cylinder 340 is operated. The vertical flow block 314 fixed at the end portion of the gripper operation rod 342 pulls the horizontal flow block 316 which is engaged with the vertical flow block 314, while ascending. The grip part 318 integrally provided at the lower end of the horizontal flow block 316 comes into close contact with the circumference of the cap (CAP) to grip the lid (CAP).

When gripping of the lid (CAP) is completed, the lid (CAP) is separated from the container (BT).

When the driving motor 350 is rotated, a driving gear 352 is rotated by the rotation of the driving motor 350. Then, a driven gear 322 engaged with the driving gear is rotated to rotate the gripper fixing pipe 320. Because the lid gripper 310 mounted at the lower end of the gripper fixing pipe 320 is rotated while gripping the lid (CAP), the lid (CAP) is opened so as to be separated from the container.

In this instance, because the gripper fixing pipe 320 must ascend while rotating, the vertical gear width of the driven gear 322 is greater than the vertical gear width of the driving gear 352 so as to maintain the gear coupling between the driving gear 352 and the driven gear even if the driven gear 322 ascends while rotating.

Next, when the separation of the lid (CAP) is completed, the fixed base 330 ascends by the operation of the base lifting cylinder 380 so that the lid (CAP) ascends above the container (BT) to be in a standby status.

Figure 13:
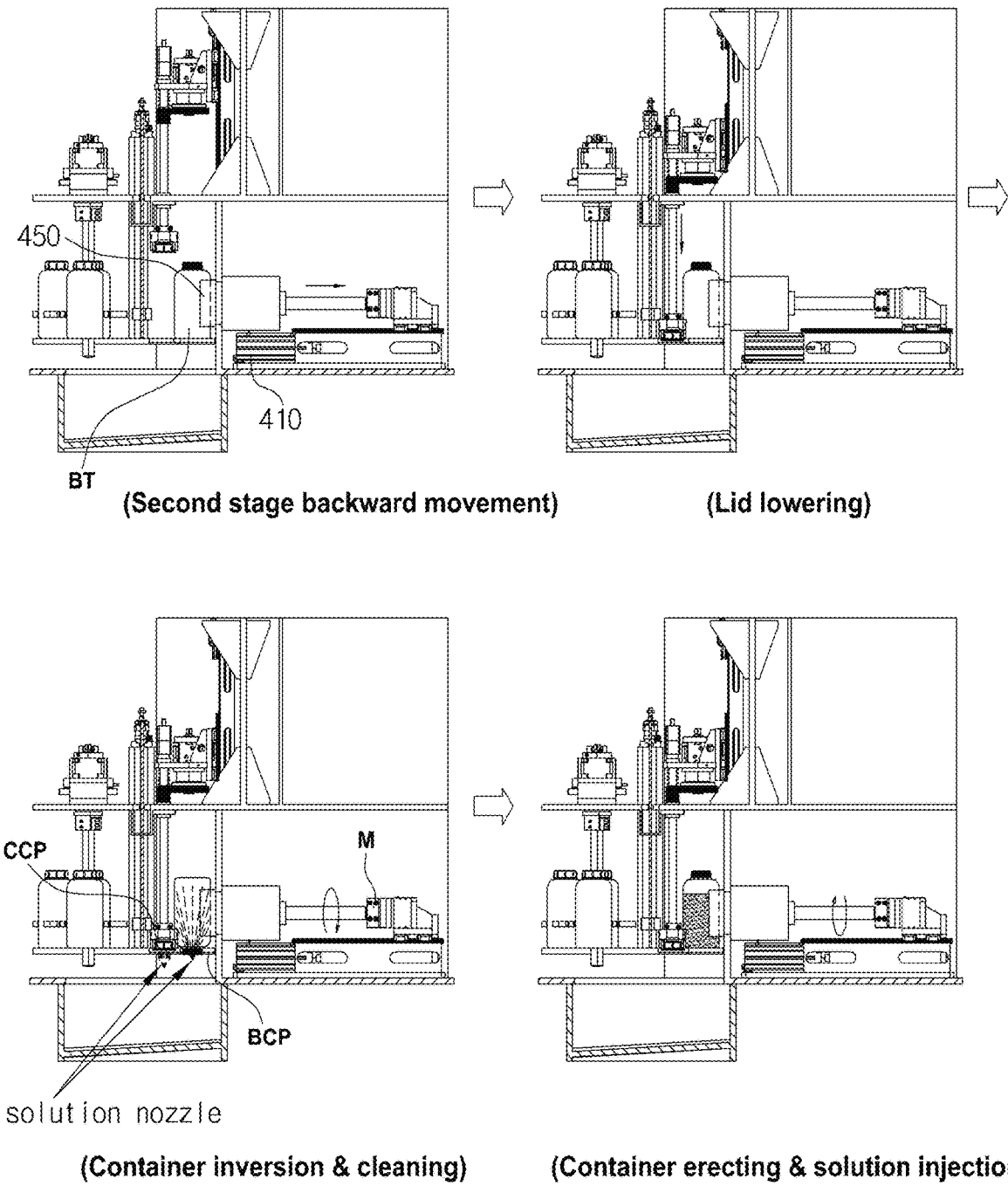

Next, as illustrated in FIG. 13, the adsorption stand 450 is moved backward by the suction cylinder 410 to move the container (BT) to the sampling position.

In this instance, the sampling position means not only a position to inject the sample solution into the container (BT), but also a position to clean the container (BT) by inverting the container (BT) at 180°.

When the container (BT) reaches the sampling position, the lid (CAP) descends to be put on the lid cleaning part (CCP).

Moreover, when the inversion motor (M) is rotated to invert the container (BT) at 180°, the lip portion of the container (BT) is seated on the container cleaning part (BCP). That is, the container (BT) is inverted.

After that, a solution (sample undiluted solution) or ultra-pure water is sprayed to clean the lid (CAP) and the inside and the lip of the container (BT).

When the cleaning is completed, the inversion motor (M) is rotated at 180° in the reverse direction to the inversion direction so as to make the inverted container (BT) stand upright.

After that, a sample solution is injected into the container (BT).

In this instance, when the level sensor 480 detects the liquid level of the sample solution, the injection of the sample solution is stopped.

Figure 14:
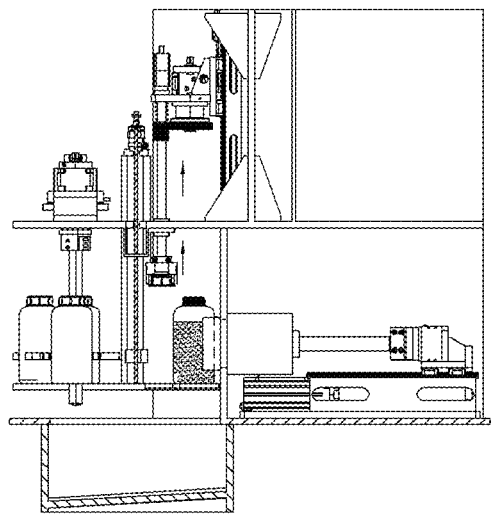
Figure 14:
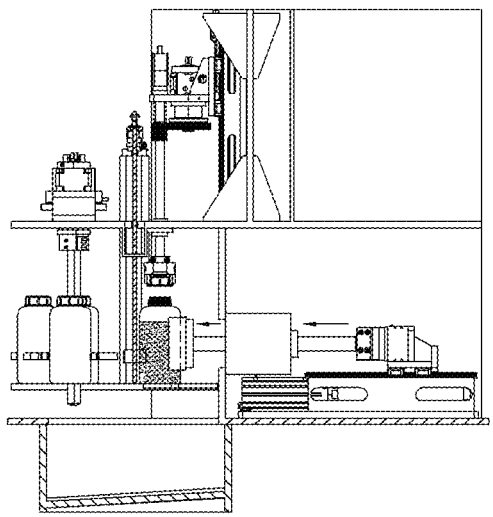
Figure 14:
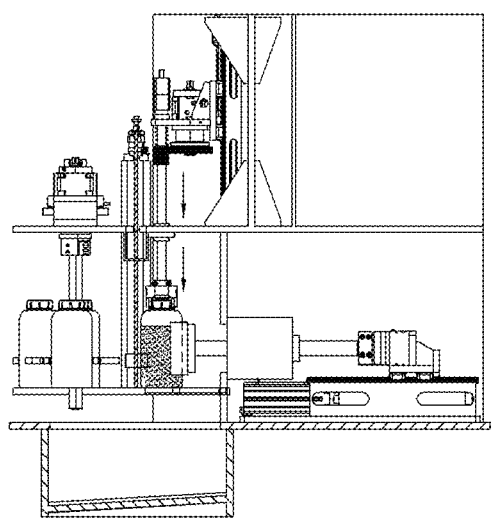
Figure 14:
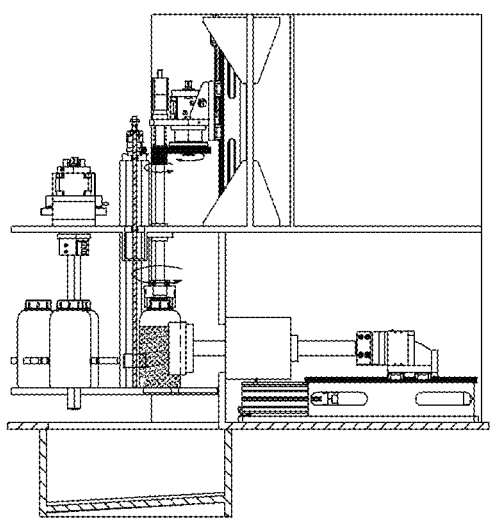

When the injection of the sample solution is completed, as illustrated in FIG. 14, the lid gripper 310 is lifted while gripping the lid (CAP), and the adsorption cylinder 410 is operated to move the adsorption stand 450 forward, thereby placing the container (BT) below the lid (CAP).

When the container (BT) is positioned below the lid (CAP), the lid (CAP) descends to be grounded to the lip of the container (BT), and then, is locked in rotation.

Figure 15:
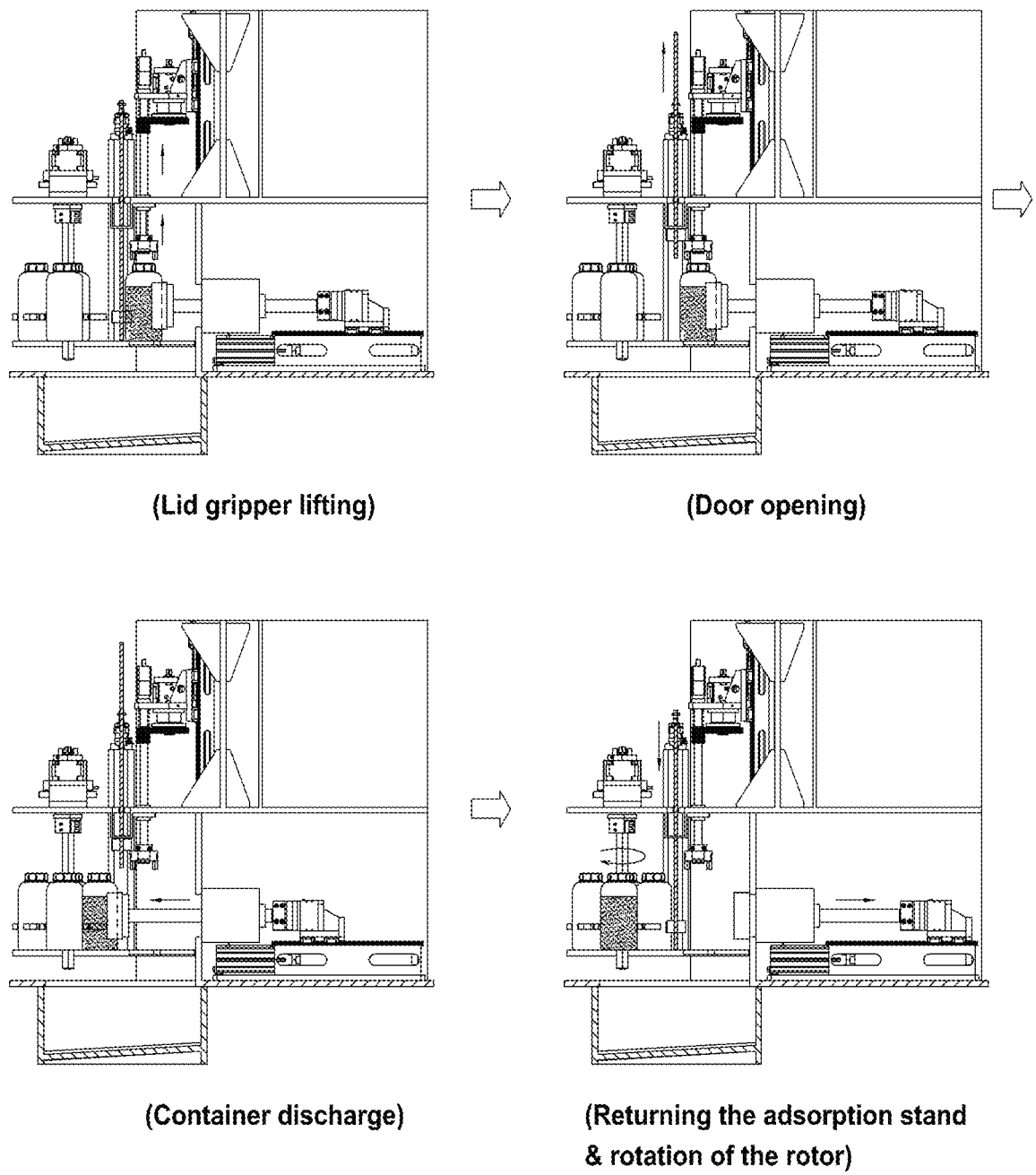

As illustrated in FIG. 15, the lid gripper 310 is lifted after releasing the gripping state, and the door (DR) is opened.

When the door (DR) is opened, the adsorption stand 450 moves forward again to enter the container standby chamber 200, and then the container (BT) is inserted into the container mounting space between the rotors 240 to release the vacuum adsorption, and then, is returned to the home position. After that, the door (DR) descends to seal the sampling chamber 300.

Additionally, when the container (BT) filled with the sample solution is mounted in the container mounting space between the rotors 240, the rotors 240 rotate to wait the next container.

As described above, when the chemical solution with harmfulness is sampled, the fully automated system according to the present invention can safely and quickly sample, thereby preventing deterioration of the sample solution, enabling more accurate analysis of the sample, and preventing accidents.

The invention claimed is:
1. An automatic sampling device comprising:
   a container standby unit for preparing a plurality of containers before testing, and sequentially rotating the container standby unit to select a container for extracting a sample, wherein
   the container standby unit comprises:
      a rotor for sequentially rotating the containers prepared in the container standby chamber at a predetermined angle;
      a container seating plate which is a plate-shaped member and on which the container for holding a sample solution is seated; and
      a rotary motor for rotating the rotor;

a container transfer unit gripping the container selected by the container standby unit, transferring the container to a sampling chamber, and automatically inverting the container, wherein
the container transfer unit comprises:
an adsorption cylinder;
an adsorption stand for vacuum-adsorbing and moving the container, which is selected from the container standby unit to the sampling chamber according to the operation of the adsorption cylinder; and
an inversion motor for rotating and driving the adsorption stand so as to invert and clean the container or to make the container stand upright to hold a sample solution; and
a lid separation unit automatically opening and closing a lid in the sampling chamber from the container transferred by the container transfer unit; wherein
the lid separation unit comprises:
a gripper fixing pipe having a lid gripper fixed at an end portion thereof;
a driving motor having a driving gear gear-coupled to a driven gear attached to the gripper fixing pipe to rotate the gripper fixing pipe;
a gripper operating cylinder connected to a gripper operating rod mounted inside the gripper fixing pipe to perform a gripping operation of the lid gripper;
a fixed base formed in the upper machine room and having the driving motor and the gripper operating cylinder mounted therein; and
a base lifting cylinder moving the fixed base vertically.

2. The automatic sampling device of claim 1, wherein the container standby unit is provided in the container standby chamber and disposed on one side of the upper part of a rectangular parallelepiped housing body,
wherein the container transfer unit is mounted in a lower machine room located on the other side opposed to the container standby chamber, and
wherein the sampling chamber is located in a space between the container standby chamber and the lower machine room.

3. The automatic sampling device of claim 2, wherein a sealing door which is openable is mounted between the container standby chamber and the sampling chamber in a vertical direction.

4. The automatic sampling device of claim 2, further comprising:
an upper machine room in which a driving unit for driving the container standby unit and the lid separation unit is mounted above the container standby chamber and the lower machine room; and
a processing chamber having auxiliary facilities.

5. The automatic sampling device of claim 4, wherein the container standby chamber, the lower machine room, the upper machine room, and the processing chamber are completely divided and partitioned by partition walls.

6. The automatic sampling device of claim 1, wherein a rotation guide plate having a circular hole with an open side is mounted above the container seating plate to be spaced apart from the container seating plate, and a rotor rotating shaft is mounted passing through the circular hole and the container seating plate.

7. The automatic sampling device of claim 6, wherein a lower portion of the rotor rotating shaft is supported by a bearing provided in the container seating plate, and an upper portion is rotatably connected to the rotary motor, and wherein the rotor is fixed to the rotor rotating shaft.

8. The automatic sampling device of claim 6, wherein a bottom surface of the container seating plate is provided with a solution receiver recessed downward.

9. The automatic sampling device of claim 8, wherein a bottom plate part is formed in the sampling chamber at the same height as the container seating plate, and
wherein the bottom plate part includes a lid cleaning part with which the lid comes into contact and which is capable of cleaning the lid by spraying a solution through a solution nozzle, and
a container cleaning part which inverts the container and is capable of cleaning the container by spraying a solution through a solution nozzle upwards.

10. The automatic sampling device of claim 1, wherein a sensor for detecting whether or not the container is mounted in the container mounting space between the rotors is mounted on a ceiling surface of the container standby chamber (200).

11. The automatic sampling device of claim 1, wherein side guides are disposed on both sides of the adsorption cylinder, slide blocks sliding according to the operation of the adsorption cylinder are respectively assembled to the side guides, and wherein the inversion motor is fixed to the slide block.

12. The automatic sampling device of claim 1, wherein the inversion motor is provided with an operation rod, wherein the adsorption stand is fixed to an end portion of the operation rod, and wherein one or a plurality of adsorption plates for vacuum-adsorbing the container is mounted on the adsorption stand.

13. The automatic sampling device of claim 12, wherein the adsorption stand is assembled and fixed to an end of the operation rod exposed to the sampling chamber after passing through the partition wall between the sampling chamber and the lower machine room.

14. The automatic sampling device of claim 12, wherein the adsorption cylinder is a multi-stage cylinder capable of stopping at three or more points.

15. The automatic sampling device of claim 12, wherein the front surface of the adsorption stand is rounded, and wherein the adsorption plate is formed by dispersing and arranging a plurality of plate for vacuum-adsorption by sucking air, or is arranged in a band shape along the circumference.

16. The automatic sampling device of claim 12, wherein the operation rod is formed in a hollow structure, and has a vacuum induction tube, which allows the adsorption plate to perform vacuum-adsorption through the hollow portion, and a wire for a sensor.

17. The automatic sampling device according to claim 12, wherein a sealing container is mounted on a wall surface of the lower machine room of the partition wall through which the operation rod passes, thereby sealing around the operation rod when the operation rod (440) is operated.

18. The automatic sampling device of claim 1, wherein a level sensor for detecting the level of the sample solution contained in the container is mounted on the upper side of the adsorption stand.

19. The automatic sampling device of claim 1, wherein the vertical width of the driven gear is greater than the vertical width of the driving gear.

20. The automatic sampling device of claim 1, wherein a spring is interposed between the driven gear and the lower end of the fixed base.

21. The automatic sampling device of claim 1, wherein the lid separation unit further comprises:

a LM guide mounted at one side of the upper machine room; and a slider inserted into the LM guide to be slidable in a vertical direction, and wherein the fixed base fixed to the slider moves vertically according to the operation of the base lifting cylinder mounted between the LM guides.

22. The fixing body of claim 1, wherein the lid gripper comprises:

a fixed body which has a bipartite structure and is fixed in a form of surrounding the gripper fixing pipe;

a vertical flow block which is disposed inside the fixed body, is fixed to an end of a gripper operating rod inserted through the gripper fixing pipe, and has inclined grooves formed on both sides;

a horizontal flow block assembled to the inclined grooves to be able to slide in an inclination direction; and a grip part integrally formed on the lower end of the horizontal flow block with a curvature and having a concavo-convex surface on the inner circumferential surface.

23. The automatic sampling device of claim 1, wherein the base lifting cylinder is a multi-stage rod-less cylinder in which a rod is embedded, and only a part of the base lifting cylinder protrudes from a cylinder body.

24. The automatic sampling device of claim 3, wherein the door comprises:

a pair of door guides mounted at both sides;

door lifting cylinders mounted at both sides of the door guides; and a lifting cylinder rod which is connected to the door lifting cylinder and to which an upper end of the door is coupled, and wherein the door ascends and descends to be opened and closed according to rise and lowering of the lifting cylinder rod.

25. A method for automatically sampling a solution using the automatic sampling device of claim 1, which comprises the container standby chamber, the sampling chamber for cleaning the container and the lid and holding the sample solution, a lower machine room which is located at the opposite side of the container standby chamber and in which the container transfer unit is mounted, and the upper machine room having a driving means for driving the container standby unit and the lid separation unit on an upper portion of the sampling chamber, the method comprising the steps of:

preparing sampling by arranging a container having the lid in a space between rotors of the container standby unit provided in the container standby chamber;

moving the container to an open position of the lid on the sampling chamber after vacuum-adsorbing the container by advancing the adsorption stand of the container transfer unit;

lowering the lid gripper of the lid separation unit to grip the lid, separating the lid from the container, and lifting the separated lid;

moving the adsorption stand backward to move the container, form which the lid is separated, to a sampling position, and lowering the lid;

rotating the inversion motor of the container transfer unit to invert the container at 180°, and cleaning the lid and the inside of the container with a solution or ultrapure water; and standing the inverted container upright, and injecting the sample solution into the container.

26. The automatic sampling method of claim 25, further comprising:

opening a door mounted between the container standby chamber and the sampling chamber before performing the step of moving the container to a lid opening position; and closing the door after performing the step of moving the container the lid opening position.

27. The method according to claim 26, further comprising the steps of:

when the step of injecting the sample solution into the container is completed, lifting the lid gripper while gripping the lid, advancing the adsorption stand to move the container below the lid, and locking the lid on the container;

lifting the lid gripper by releasing the gripped state, and opening the door;

advancing the adsorption stand to discharge the container holding the sample solution to the container standby chamber, and returning the adsorption stand to the home position by releasing vacuum adsorption state; and;

rotating the rotor to extract the sampling-completed container and waiting a next container.

* * * * *